(12) United States Patent
Takasu

(10) Patent No.: US 6,523,127 B1
(45) Date of Patent: Feb. 18, 2003

(54) DISPLAY APPARATUS HAVING A POWER SAVING MODE

(75) Inventor: Shigeru Takasu, Tokyo (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 09/334,800

(22) Filed: Jun. 16, 1999

(30) Foreign Application Priority Data

Jun. 30, 1998 (JP) .......................................... 10-183161

(51) Int. Cl.[7] .................................................. G06F 1/32
(52) U.S. Cl. ...................................................... 713/324
(58) Field of Search ................................ 713/310, 320, 713/323, 324

(56) References Cited

U.S. PATENT DOCUMENTS

| 5,548,765 A | * | 8/1996 | Tsunoda et al. | 359/630 |
| 5,671,017 A | * | 9/1997 | Chujo | 348/378 |
| 5,943,228 A | * | 8/1999 | Kim | 340/654 |
| 6,006,335 A | * | 12/1999 | Choi et al. | 713/300 |
| 6,038,670 A | * | 3/2000 | Oh | 713/300 |
| 6,105,143 A | * | 8/2000 | Kim | 713/324 |
| 6,119,225 A | * | 9/2000 | Kim | 713/1 |
| 6,243,819 B1 | * | 6/2001 | Jung | 713/300 |

* cited by examiner

Primary Examiner—Glenn A. Auve
(74) Attorney, Agent, or Firm—Lerner, David, Littenberg, Krumholz & Mentlik, LLP

(57) ABSTRACT

A display apparatus connected to a personal computer for carrying out character display or graphic display in accordance with information from the personal computer, which is installed with a power saving button for instructing a shift to a power saving mode for reducing power consumption and a micro controller for determining input of the power saving button and controlling a power supply, a deflection circuit and an image circuit to shift to the power saving mode.

9 Claims, 1 Drawing Sheet

DISPLAY APPARATUS HAVING A POWER SAVING MODE

BACKGROUND OF THE INVENTION

1. Field of the Invention

The present invention relates to a display apparatus and more particularly to a display apparatus of a power saving type used in a personal computer or the like.

2. Description of Related Art

In recent years, for example, in the field of a display apparatus such as CRT (Cathode Ray Tube) display or the like, there has intensively requested a reduction in power consumption inclusive of a countermeasure for prevention of global warming. Particularly, in the case of a CRT display, power consumption is large compared with that of liquid crystal and a further low power formation is requested. For such purpose, there has been adopted a method in which a situation of using, for example, a keyboard or a mouse in a personal computer or a word processor is monitored and power is automatically saved when it is not used for a constant period of time. Further, in a personal computer or the like, there is achieved a reduction in power consumption by darkening a screen of a personal computer or the like by a "screen saver" darkening only a video signal to thereby achieve prevention of burning of a CRT display as well.

FIG. 3 is a block diagram showing a constitution of a personal computer 2 and a display apparatus 1 having a conventional power saving function. The personal computer 2 monitors a situation of using a keyboard 21 or a mouse 22 and when the personal computer 2 determines that they are not used for a predetermined period of time, the personal computer 2 makes OFF horizontal and vertical synchronizing signals and outputs a sign of power saving to the display apparatus 1. The side of the display apparatus 1 detects the sign by a micro controller 11 and reduces power consumption by controlling to cut a power source 12 or stop deflection of a deflection circuit 13 based on the detection.

Further, according to JP-A-3-46022, a personal computer is installed with a sensor for detecting approach of an operator and makes a display portion of a CRT display or the like function when the operator approaches. Although in this example, there is no explanation of a case of bringing about a power saving state, it seems that the power saving state is brought about when approach of the operator is not detected for a predetermined period of time or when the display is not used for a predetermined period of time.

However, there pose problems in such examples.

1) The power saving state is brought about when it is detected that a personal computer is not used over a certain constant time period or the power saving state is brought about when the operator leaves over a predetermined time period and the display unit functions when the operator approaches the screen and accordingly, power saving cannot be carried out at an arbitrary occasion. That is, power saving is carried out by detecting that the screen is not used or the user leaves therefrom and accordingly, a wait time period to some degree is needed for the personal computer to determine that the screen has not been used.

2) In the case of a system in which it is not only a monitor that can carry out power saving, when a host apparatus executes a job which does not need to display (for example, reproduction of a digital audio signal), even if only power of the monitor is intended to save, the power cannot be saved.

3) Even when a power saving button is installed to a personal computer, it cannot be simply operated in the case where the personal computer is put under a desk or the like. Further, the method of carrying out power saving from the side of a personal computer is difficult to know by a user and poses many problems in operation.

4) When a signal source having no power saving function as in VTR (Video Tape Recorder) is connected, power saving cannot be brought about.

5) Even when a monitor is brought into power saving, in the case where the host side cannot detect the situation, operation of the monitor cannot be recovered by key input or the like.

As described above, according to the conventional display apparatus, there poses a problem in which power saving cannot be executed at arbitrary time and the side of the display apparatus cannot bring about the power saving state by itself. Further, the operation of power saving must be carried out and the side of a personal computer and accordingly, there poses a problem in operability.

SUMMARY OF THE INVENTION

The present invention resolves the above problem and realizes a display apparatus capable of bringing about a power saving state by itself at arbitrary time on the side of a display apparatus and capable of instantaneously informing a host side that the power saving state is brought about by a comparatively simple method.

In order to resolve the above-described problem, according to an aspect of the present invention, there is provided a display apparatus having a power supply circuit and a display circuit and connected to an information processing apparatus for carrying out character display or graphic display in accordance with information transmitted from the information processing apparatus, the display apparatus comprising power saving switch means for instructing a shift to a power saving mode for reducing power consumption, and control means for determining input of the power saving switch means and controlling the power source circuit and/or the display circuit to shift to the power saving mode.

Further, according to other aspect of the present invention, there is provided a display apparatus having a power supply circuit and a display circuit and connected to an information processing apparatus for carrying out character display or graphic display in accordance with information transmitted from the information processing apparatus, the display apparatus comprising remote operation instruction receiving means for receiving a signal from an outside remote operation means, and control means for determining that the remote operation instruction receiving means receives an instruction to shift to a power saving mode from the outside remote operation means and controlling the power supply circuit and/or the display circuit to shift to the power saving mode.

DETAILED DESCRIPTION OF THE PREFERRED EMBODIMENTS

A detailed explanation will be given of a display apparatus according to the present invention in reference to the attached drawings as follows.

Figure 1:
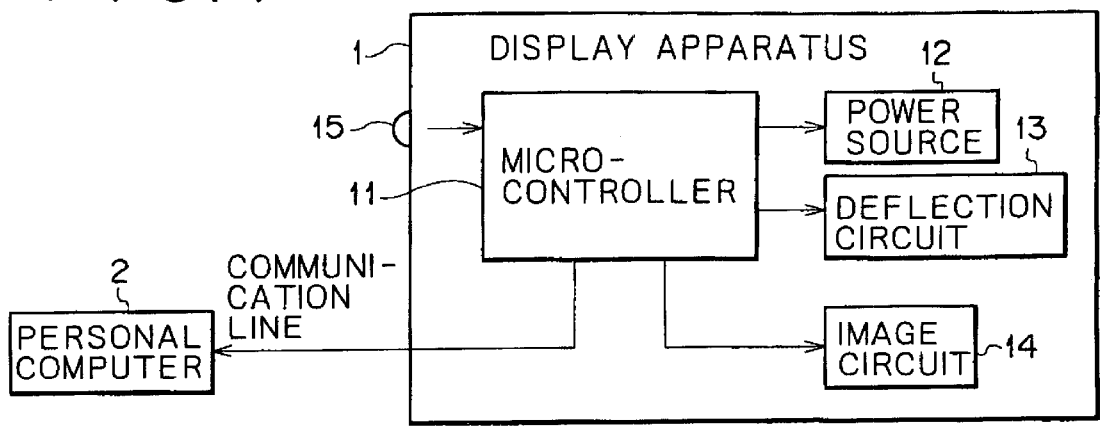
FIG. 1 is a block diagram showing a constitution of a display apparatus according an embodiment of the present invention.

FIG. 1 is a block diagram showing a constitution of a display apparatus according to an embodiment of the present invention.

In FIG. 1, numeral 1 designates a display apparatus, numeral 2 designates a personal computer which is an information processing apparatus, numeral 11 designates a micro controller for controlling the display apparatus 1, numeral 12 designates a power source, numeral 13 designates a deflection circuit, numeral 14 designates an image circuit and numeral 15 designates a power saving button.

On the display apparatus 1, there is installed the power saving button 15 (or a touch panel or the like) to which a user can easily make access and there is installed a circuit of the micro controller 11 or the like for detecting operation of the power saving button 15. The micro controller 11 is provided with a function of reducing power consumption by a processing of making OFF the main power source 12 or making OFF a high voltage power supply of the deflection circuit 13 or reducing the amplitude by lowering an amplifying rate of the image circuit 14 (power saving mode). When the user operates the power saving button 15, the micro controller 11 detects this and the operation shifts to the power saving mode.

Figure 2:
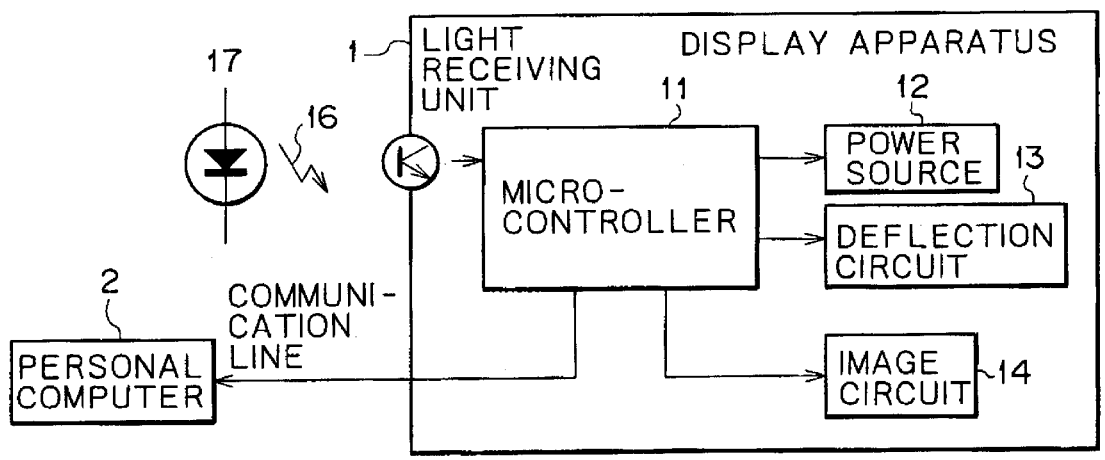
FIG. 2 is a block diagram showing a constitution of a display apparatus according to other embodiment of the present invention.
Figure 3:
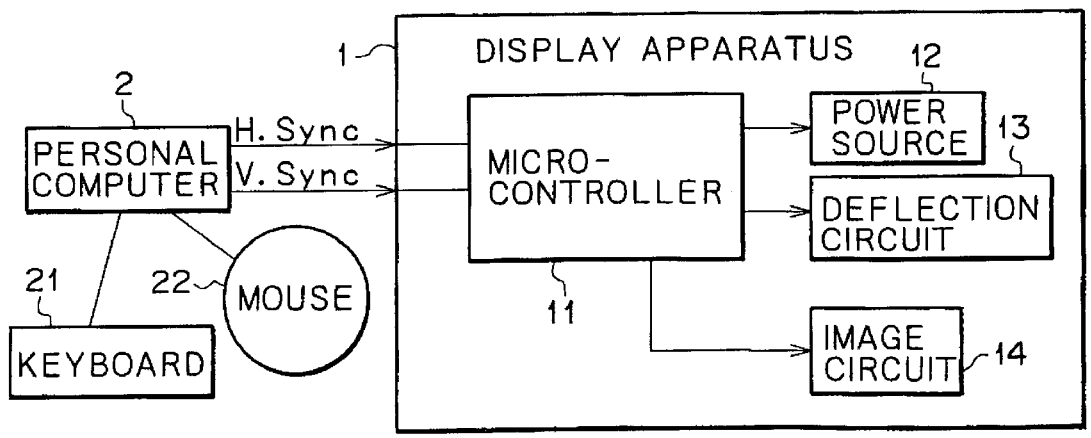
FIG. 3 is a block diagram showing a constitution of a conventional display apparatus.

FIG. 2 is a block diagram showing a constitution of a display apparatus according to other embodiment of the invention.

In FIG. 2, numeral 1 designates a display apparatus, numeral 2 designates a personal computer, numeral 11 designates a micro controller for controlling the display apparatus 1, numeral 12 designates the power source, numeral 13 designates the deflection circuit, numeral 14 designates the image circuit, numeral 16 designates an infrared ray remote control signal receiving unit and numeral 17 designates an infrared ray remote control apparatus.

The display apparatus 1 is provided with the infrared ray remote control signal receiving unit 16 for receiving an infrared ray remote control signal outputted from the infrared ray remote control apparatus 17 at outside and the micro controller 11 carries out the power saving mode such that the main power source 12 is made OFF, the high voltage power supply of the deflection circuit 13 is made OFF or the amplitude is reduced by lowering the amplifying rate of the image circuit 14 when the infrared ray remote control signal receiving unit 16 detects reception of a power saving instruction by the infrared ray remote control signal.

In any case of FIG. 1 and FIG. 2, the micro controller 11 can inform the personal computer 2 that the power saving mode is started via a communication line between the personal computer 2 and the display 1 such as USB (Universal Serial Bus), DDC (Display Data Channel) or IEEE (The Institute of Electrical and Electronic Engineers) 1394 and accordingly, the personal computer 2 can take an action in accordance therewith.

A simple explanation will be given of USB and DDC.

USB is a specification of interface for a personal computer for connecting a peripheral apparatus, which is aimed at common formation of interface of a mouse, a keyboard, a printer, a modem, a display, a speaker, a joy stick and so on. It is the specification devised by seven companies of Intel, Microsoft and so on in cooperation with each other.

DDC is a standard for realizing "plug and play" of Windows 95 on a display and is devised by VESA (Video Electronics Standard Association) which is an association for standardizing graphic mechanism. The display side is mounted with ROM (Read Only Memory) stored with information necessary for "plug and play".

As is apparent from the above-described explanation, according to the present invention, there is carried out means for power saving by cutting power supply of the display, reducing the deflection size, reducing the amplitude of a video signal amplifier, lowering high voltage, reducing an output of voice or the like by software control or hardware control and when the button is pushed, the operation can shift to the low power mode instantaneously.

Further, the operation can recover to an original state instantaneously by the same button and accordingly, there are achieved the following merits.

1) Power of the monitor having large power consumption can be reduced frequently and easily.

2) Power of the monitor can be saved even in the midst of using the personal computer, for example, in the midst of hearing a digital audio signal.

3) Power of the monitor can be saved even when the personal computer is placed at a location at which the personal computer is difficult to operate.

4) Power of the display apparatus can be saved even when the display apparatus is connected to a signal source having no power saving function.

5) By the button on the display apparatus, power of not only the display apparatus but also other peripheral apparatus can be saved or other peripheral apparatus can be operated to recover from the power saving state by informing the state to a host personal computer via a communication line.

As has been explained, according to the aspect of the present invention, there is provided a display apparatus having a power supply circuit and a display circuit and connected to an information processing apparatus for carrying out character display or graphic display in accordance with information transmitted from the information processing apparatus, the display apparatus comprising power saving switch means for instructing a shift to a power saving mode for reducing power consumption, and control means for determining input of the power saving switch means and controlling the power source circuit and/or the display circuit to shift to the power saving mode.

Thereby, there can be realized a display apparatus capable of bringing about the power saving state on the side of the display apparatus per se at arbitrary time on the side of the display apparatus by comparatively easy operation of turning on the switch.

According to the other aspect of the present invention, there is provided a display apparatus having a power supply circuit and a display circuit and connected to an information processing apparatus for carrying out character display or graphic display in accordance with information transmitted from the information processing apparatus, the display apparatus comprising remote operation instruction receiving means for receiving a signal from an outside remote operation means, and control means for determining that the remote operation instruction receiving means receives an instruction to shift to a power saving mode from the outside remote operation means and controlling the power supply circuit and/or the display circuit to shift to the power saving mode.

Thereby there can be realized a display apparatus capable of bringing about the power saving state on the side of the display apparatus per se at arbitrary time on the side of the display apparatus by a comparatively easy method of transmitting the signal from the remote control apparatus.

Another aspect of the present invention is featured in including control information transmitting means for informing the shift to the power saving mode by the control means to the information processing apparatus. Thereby, the host information processing apparatus is informed that the power saving state is brought about on the side of the display apparatus and a succeeding processing can be facilitated.

Another aspect of the present invention is featured in that the outside remote operation means receives the signal by infrared ray space transmission and remote operation instruction receiving means receives the infrared ray signal.

Thereby, the display apparatus can easily be shifted to the power saving mode by special remote operation.

What is claimed is:

1. A display apparatus connected to an information processing apparatus, said display apparatus comprising:

a power supply circuit and a display circuit;

power saving switch means for generating an output to initiate a shift to a power saving mode during which an amplitude of an output of said display circuit is reduced; and control means for detecting said output of said power saving switch means and, in response thereto, for shifting at least one of said power supply circuit and said display circuit to said power saving mode, wherein said control means informs said information processing apparatus of the shift to said power saving mode.

2. The display apparatus according to claim 1, wherein a voice output of said display circuit is reduced during said power saving mode.

3. A display apparatus connected to an information processing apparatus, said display apparatus comprising:

a power supply circuit and a display circuit;

power saving switch means for generating an output to initiate a shift to a power saving mode;

control means for detecting said output of said power saving switch means and, in response thereto, for shifting at least one of said power supply circuit and said display circuit to said power saving mode; and control information transmitting means for informing said information processing apparatus of the shift to said power saving mode.

4. The display apparatus according to claim 3, wherein said display circuit includes a deflection circuit and an image circuit.

5. The display apparatus according to claim 4, wherein an output of said deflection circuit is reduced or switched off during said power saving mode.

6. The display apparatus according to claim 4, wherein an amplitude of a video signal amplifier of said image circuit is reduced during said power saving mode.

7. The display apparatus according to claim 3, wherein a main power supply of said display apparatus is switched off during said power saving mode of said display circuit.

8. A display apparatus connected to an information processing apparatus, said display apparatus comprising:

a power supply circuit and a display circuit;

remote operation instruction receiving means for receiving a signal from an outside remote operation means; and control means for detecting that said remote operation instruction receiving means has received an instruction within said signal to shift to a power saving mode and, in response thereto, for shifting at least one of said power supply circuit and said display circuit to said power saving mode, wherein an amplitude of an output of said display circuit is reduced during said power saving mode, wherein said control means informs said information processing apparatus of the shift to said power saving mode.

9. A display apparatus connected to an information processing apparatus, said display apparatus comprising:

a power supply circuit and a display circuit;

remote operation instruction receiving means for receiving a signal from an outside remote operation means;

control means for detecting that said remote operation instruction receiving means has received an instruction within said signal to shift to a power saving mode within said signal and, in response thereto, for shifting at least one of said power supply circuit and said display circuit to said power saving mode; and control information transmitting means for informing said information processing apparatus of the shift to said power saving mode.

* * * * *

UNITED STATES PATENT AND TRADEMARK OFFICE
CERTIFICATE OF CORRECTION

PATENT NO. : 6,523,127 B1
DATED : February 18, 2003
INVENTOR(S) : Shigeru Takasu It is certified that error appears in the above-identified patent and that said Letters Patent is hereby corrected as shown below:

Column 5,
Line 28, after the word "reduced" insert -- to a non-zero value --.

Signed and Sealed this

Nineteenth Day of July, 2005

JON W. DUDAS
*Director of the United States Patent and Trademark Office*